United States Patent [19]
Sakai et al.

[11] Patent Number: 5,939,794
[45] Date of Patent: Aug. 17, 1999

[54] ENGINE CONTROL SYSTEM FOR HYBRID VEHICLE

[75] Inventors: Shoji Sakai, Toyota; Hironori Asa, Okazaki; Sadahisa Onimaru, Chiryu; Mitsuo Inagaki, Okazaki, all of Japan

[73] Assignee: Nippon Soken, Inc., Nishio, Japan

[21] Appl. No.: 08/686,389

[22] Filed: Jul. 25, 1996

[30] Foreign Application Priority Data

Jul. 25, 1995 [JP] Japan .................................... 7-189054
Jan. 22, 1996 [JP] Japan .................................... 8-008542

[51] Int. Cl.$^6$ .............................. F02N 11/06; H02P 9/04
[52] U.S. Cl. .................. 290/40 A; 290/40 B; 290/40 R; 290/40 C; 322/16; 322/29
[58] Field of Search .............................. 290/40 D, 40 B, 290/40 C; 318/139; 322/16, 29; 180/65.2, 243

[56] References Cited

U.S. PATENT DOCUMENTS

| | | | |
|---|---|---|---|
| 5,176,213 | 1/1993 | Kawai et al. | 180/243 |
| 5,418,437 | 5/1995 | Couture et al. | 318/139 |
| 5,428,274 | 6/1995 | Furutani et al. | 318/139 |
| 5,495,906 | 3/1996 | Furutani | 180/65.2 |
| 5,545,928 | 8/1996 | Kotani | 290/40 AC |
| 5,550,445 | 8/1996 | Nii | 318/153 |
| 5,586,613 | 12/1996 | Ehsani | 180/65.2 |
| 5,608,310 | 3/1997 | Watanabe | 322/29 |
| 5,625,921 | 5/1997 | Farrall | 322/40 |
| 5,635,805 | 6/1997 | Ibaraki et al. | 318/139 |
| 5,650,713 | 7/1997 | Takeuchi et al. | 322/16 |
| 5,650,931 | 7/1997 | Nii | 364/424 |

FOREIGN PATENT DOCUMENTS 6-245320  9/1994  Japan .

*Primary Examiner*—Elvin G. Enad
*Attorney, Agent, or Firm*—Pillsbury Madison & Sutro LLP

[57] ABSTRACT

A series hybrid vehicle includes a generator to be driven by an engine, a battery to be charged by the output power of the generator, and a motor for driving the vehicle using the output power sent from the generator and the output power sent from the battery. In an engine control system for the series hybrid vehicle, the values of power demanded by the vehicle when the vehicle is running (i.e., power demand values) are derived based on various engine operation indicative sensor signals, and a running state of the vehicle is estimated based on a frequency distribution of the power demand and a mean value of such power demand values. The system selects one of prestored control patterns depending on the estimated vehicle running state and controls the engine based on the selected control pattern so as to further control the output power of the generator. The system is also applicable to a parallel hybrid vehicle.

17 Claims, 8 Drawing Sheets

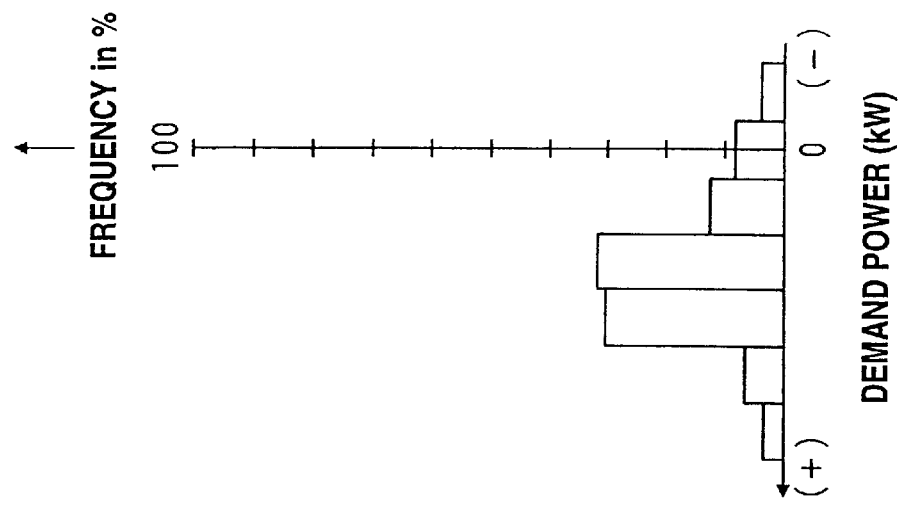
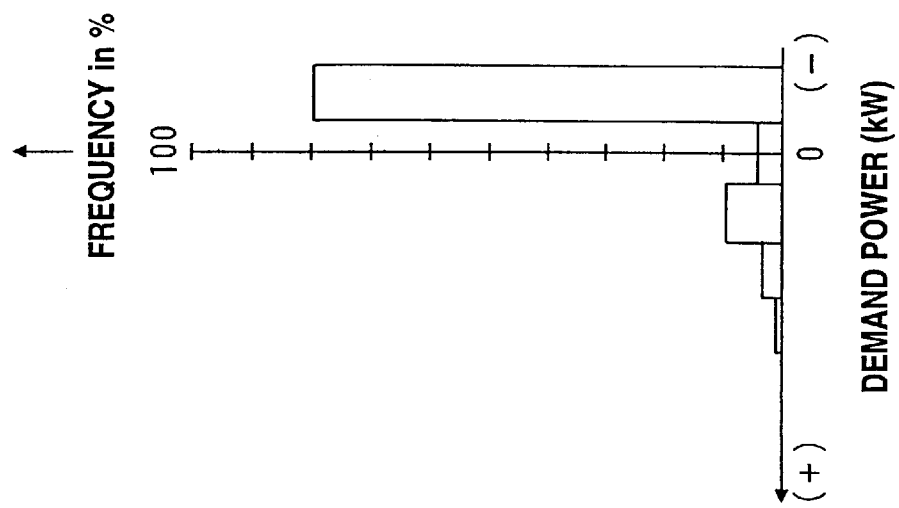
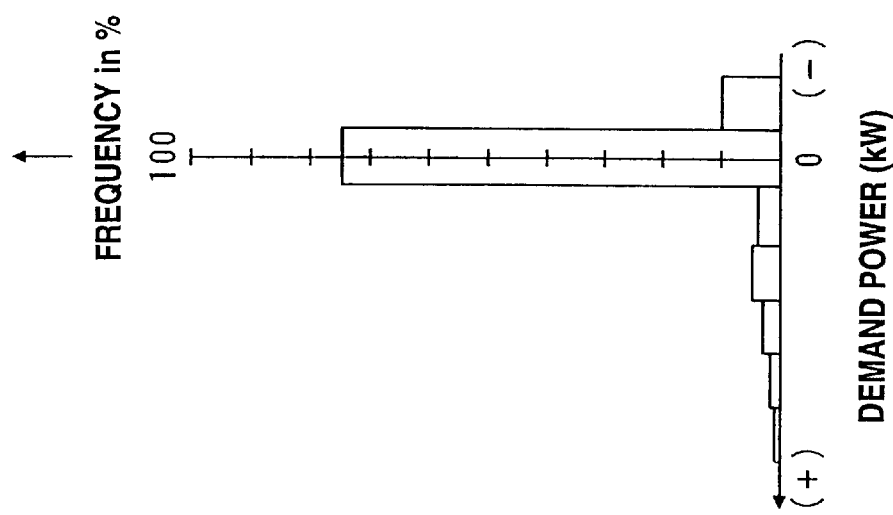

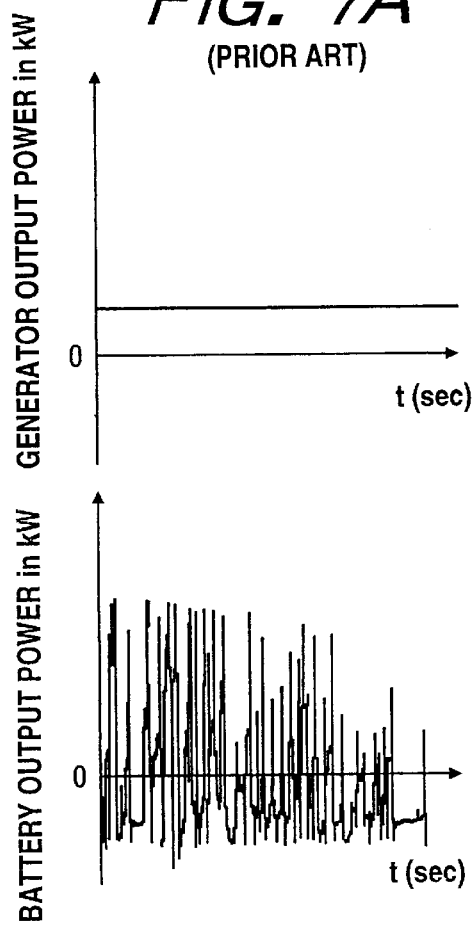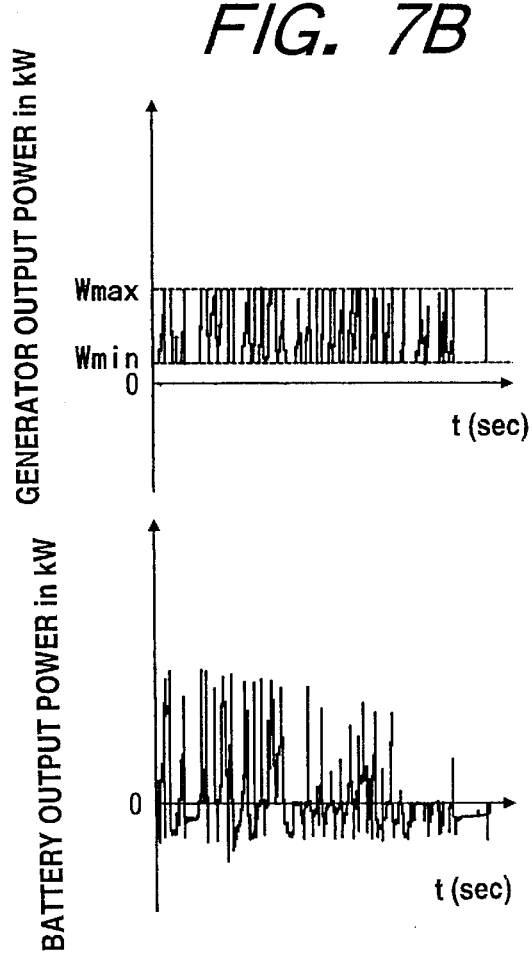

ENGINE CONTROL SYSTEM FOR HYBRID VEHICLE

BACKGROUND OF THE INVENTION

1. Field of the Invention

The present invention relates to a hybrid vehicle having installed therein a motor powered by a battery and an engine using gasoline or gas oil as fuel, and more specifically, to an engine control system for the hybrid vehicle, wherein the battery is rechargeable using the engine.

2. Description of the Prior Art

As compared with the general vehicle having an engine as a driving source, the so-called electric vehicle having a motor as a driving source has advantages of no air pollution, less noise pollution and excellent response in acceleration and deceleration, while having disadvantages of short traveling distance due to the capacity limit of a battery and less economical efficiency due to the high energy unit cost per running distance. Under these circumstances, in order to compensate for the disadvantages of the electric vehicle and to make the best use thereof, various hybrid vehicles having a motor and an engine have been proposed.

There have been available the series hybrid vehicles (SHV) in which only the motor is used as a driving source of the vehicle and the engine is used as a driving source of a generator for charging the battery, and the parallel hybrid vehicles (PHV) in which the motor and the engine are selectively used as driving sources of the vehicle depending on the running condition or the like. The parallel hybrid vehicles include a type in which the motor has a function of a generator for charging the battery.

In charging the battery of the hybrid vehicle, the engine operation is controlled so as to prevent a battery residual amount from becoming less than a preset value. This prevents over charging or over discharging of the battery so as to avoid reduction of the battery life, and further ensures that the battery residual amount is constantly held within the proper range so as to drive the motor reliably.

Further, for improving the exhaust emission and the fuel consumption of the engine, it is necessary that the engine be operated within the optimum emission/fuel consumption range. Japanese First (unexamined) Patent Publication No. 6-245320 discloses a technique for controlling the output of the engine within the optimum emission/fuel consumption range depending on the mean value of the output power of the battery.

However, if the engine output is simply controlled depending on the mean value of the battery output power as in the disclosed technique, it has been found that a charging loss is likely to increase due to the battery charge. Further, when the hybrid vehicle runs on a road having repetitive upward and downward slopes, such as a road in the mountains, it is possible for large current to be drawn from the battery or for the battery to be charged with such as large current. This causes the battery to be subjected to an excessive burden and shortens the life of the battery.

SUMMARY OF THE INVENTION

Therefore, it is an object of the present invention to provide an improved engine control system for a hybrid vehicle.

According to one aspect of the present invention, an engine control system for a hybrid vehicle having an engine, a motor and a battery for supplying power to the motor, comprises running state detecting means for detecting a running state of the vehicle based on a frequency distribution of power demand values (i.e., values of power demanded by the vehicle when the vehicle is running) and a mean value of the power values demand for a given time period, each of the power demand values being derived based on a sensor signal indicative of an operating condition of the vehicle; and control means for controlling an operation of the engine depending on the running state detected by the running state detecting means.

The system may be arranged such that the control means changes the operation of the engine depending on the derived power demand values when a variation of the derived power demand values is determined to be large, while holding the operation of the engine constant relative to the derived power demand values when the variation of the derived power demand values is determined to be small.

The system also may be arranged such that the control means selects one of prestored engine operation control patterns based on the detected running state so as to control the operation of the engine based on the selected engine operation control pattern.

It may be arranged that the vehicle is a series hybrid vehicle having a generator driven by the engine and such that the battery is charged by an output power of the generator and the motor is driven by the output power of the generator and an output power of the battery.

The system may be arranged such that the operation of the engine is the speed of the engine.

The system also may be arranged such that the vehicle is a parallel hybrid vehicle in which the engine is mechanically coupled to driven wheels.

The system may be arranged such that the operation of the engine is an output of the engine.

BRIEF DESCRIPTION OF THE DRAWINGS

The present invention will be understood more fully from the detailed description given hereinbelow, taken in conjunction with the accompanying drawings.

In the drawings:

FIGS. 3A and 3B are diagrams for explaining the operation of the ECU in more detail;

FIG. 4 is a diagram for explaining the operation of the ECU in more detail;

FIG. 7A is a diagram showing one example of output power of a battery while a vehicle is running according to the prior art;

FIG. 7B is a diagram showing one example of output power of a battery while the vehicle is running according to the first preferred embodiment;

DESCRIPTION OF THE PREFERRED EMBODIMENT

Now, preferred embodiments of the present invention will be described hereinbelow with reference to the accompanying drawings. Throughout the figures, the same or like components are assigned the same reference marks or symbols so as to avoid redundant description.

Figure 1:
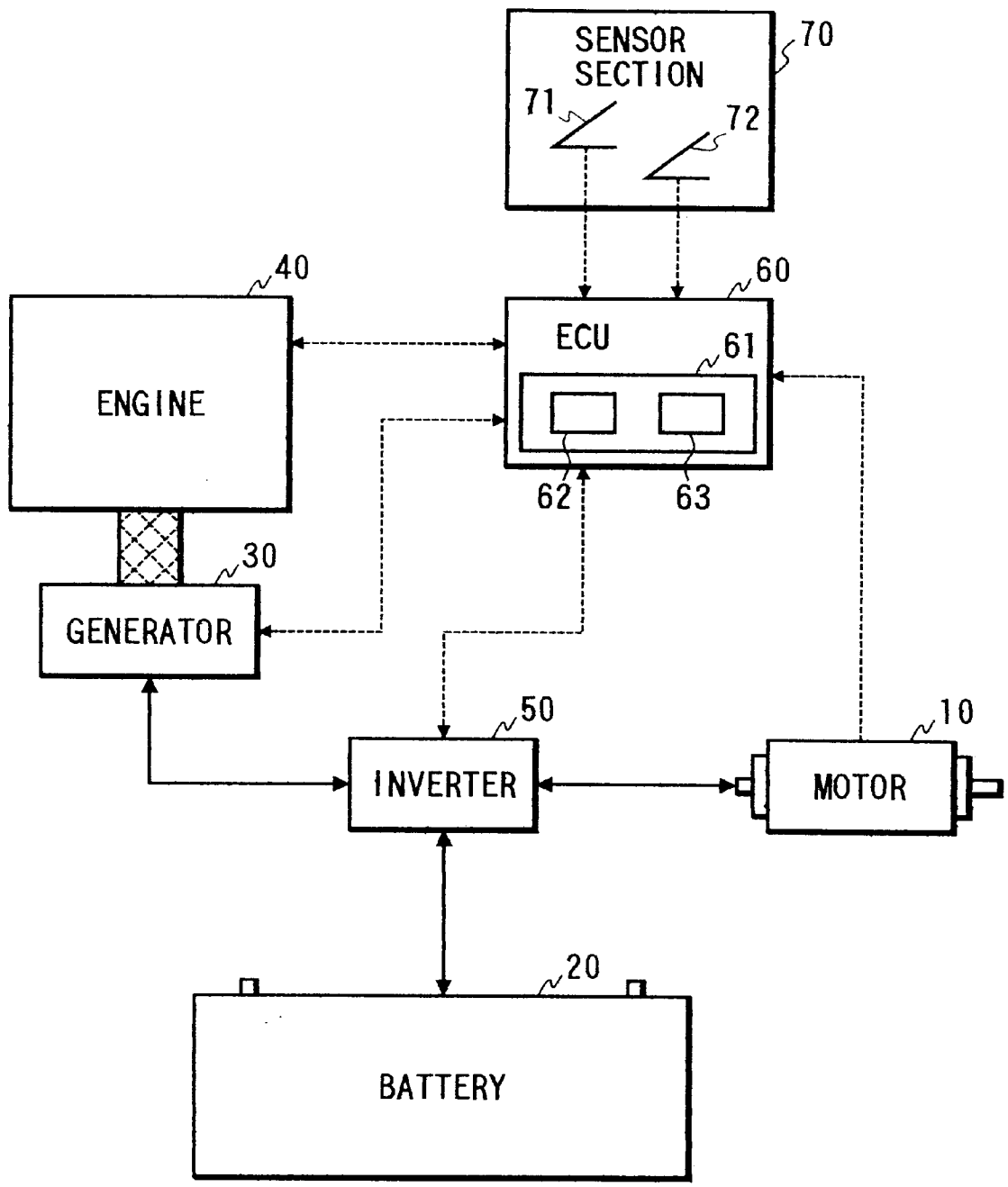
FIG. 1 is a diagram showing a schematic structure of an engine control system for a series hybrid vehicle according to a first preferred embodiment of the present invention.

FIG. 1 is a diagram showing a schematic structure of an engine control system for a series hybrid vehicle according to a first preferred embodiment of the present invention.

In FIG. 1, the engine control system includes an engine 40, a generator 30 coupled to the engine 40, an inverter 50 electrically connected to the generator 30, a battery 20 charged by the generator 30 via the inverter 50, and a motor 10 driven by the output power of the battery 20 and the output power of the generator 30 via the inverter 50.

An ECU (electronic control unit) 60, which controls an operation of the engine 40, is connected to a sensor section 70.

The sensor section 70 is provided with various sensors, such as an accelerator pedal sensor 71, a brake pedal sensor 72 and a speed sensor (not shown). Although not shown, the ECU 60 includes memories for storing a later-described control program and various data, and interface circuits for sending and receiving signals relative to the associated components and the sensors of the engine control system.

In view of the high efficiency, the engine 40 is operated with WOT (wide open throttle) in case of the gasoline engine. Specifically, the engine 40 is operated with a throttle valve being fully open, and the output of the engine is controlled by the ECU 60 based on the fuel injection amount. Further, for the highly efficient operation, the output range of the engine is limited and the engine is of a type whose output is directly proportional to the speed thereof.

The generator 30 is driven by the engine 40. The output power of the generator 30 changes depending on the speed thereof, and the field current of the generator 30 is controlled by the ECU 60 via the inverter 50.

As appreciated, the number of the motors 10, as driving sources, of the hybrid vehicle depends on the specification thereof, and one of them is shown in FIG. 1. The motor 10 is in the form of a dc or ac motor whose output shaft is drivingly connected to driven wheels (not shown) of the vehicle via a power transmission mechanism (not shown).

Under the control of the ECU 60, the inverter 50 normally connects the motor 10 to the battery 20 electrically during the vehicle running so that the motor 10 receives the power from the battery 20 to drive the vehicle. On the other hand, during the vehicle deceleration, the inverter 50 causes the motor 10 to work as a generator so that the battery 20 is charged by the generated deceleration regenerative power.

The motor 10 is driven by the output power of the generator 30 and the output power of the battery 20, and the residual power of the generator 30 is used for charging the battery 20 via the inverter 50.

The ECU 60 includes engine control means 61. The engine control means 61 includes vehicle running state detecting means 62 and engine operation control means 63. The vehicle running state detecting means 62 estimates the vehicle running state based on a frequency distribution of the values of power demanded by the vehicle when the vehicle is running (i.e., power demand values) which are derived from various sensor signals obtained at the sensor section 70 and a mean value of the power demand values. On the other hand, the engine operation control means 63 selects one of several control patterns prestored in the memory of the ECU 60 based on the vehicle running state estimated by the vehicle running state detecting means 62, so as to control the operation of the engine 40 and thus the output power of the generator 30.

Figure 2A:
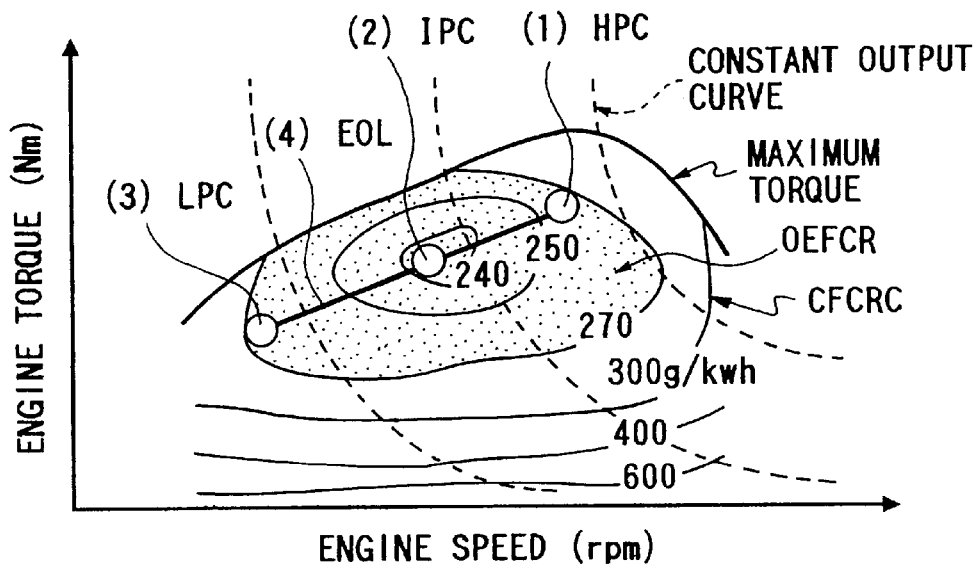
FIG. 2A is a diagram for explaining control patterns for controlling an engine operation of the series hybrid vehicle using an ECU.

FIG. 2A is a diagram for explaining the foregoing control patterns for controlling the engine operation of the series hybrid vehicle by the engine operation control means 63. In FIG. 2A, CFCRC represents constant-fuel-consumption-rate curves derived based on a relationship between the engine speed and the engine torque. The control patterns include (1) a high power constant (HPC) pattern in the optimum emission/fuel consumption range (OEFCR); (2) an intermediate power constant (IPC) pattern in the optimum emission/fuel consumption range; (3) a low power constant (LPC) pattern in the optimum emission/fuel consumption range; (4) a power varying pattern on an engine operating line (EOL) where the fuel consumption rate relative to the power is the best in the optimum emission/fuel consumption range. Each of these four control patterns is stored in the memory of the ECU 60 so as to be selectable by the vehicle running state estimated by the vehicle running state detecting means 62.

FIGS. 3A and 3B are diagrams for explaining the operation of the engine control means 61 in more detail.

If, as shown in FIG. 3A, the frequency distribution of the power demand values is concentrated around a power demand value of 0 (zero), the vehicle running state detecting means 62 estimates that the vehicle is stopped or in a traffic jam. In this case, the engine operation control means 63 stops the engine 40 or selects the low power constant pattern so as to set the low power constant operation of the engine 40.

If, as shown in FIG. 3B, the frequency distribution of the power demand values is concentrated at a region corresponding to negative power demand values, the vehicle running state detecting means 62 estimates that the vehicle is running on a downward slope. In this case, the engine operation control means 63 stops the engine 40 or selects the low power constant pattern so as to set the low power constant operation of the engine 40.

FIG. 4 is a diagram for explaining the operation of the engine control means 61 in more detail.

If, as shown in FIG. 4, the frequency distribution of the power demand values is concentrated at a region corresponding to positive power demand values and further the mean value of the power demand values is greater than a given value (which has been determined based on preselected factors of the vehicle), the vehicle running state detecting means 62 estimates that the vehicle is running on an upward slope or under a heavy load. In this case, the engine operation control means 63 selects the high power constant pattern so as to set the high power constant operation of the engine 40. On the other hand, if the foregoing mean value is no greater than the foregoing given value, the engine operation control means 63 selects the intermediate power constant pattern so as to set the intermediate power constant operation of the engine 40.

Figure 5A:
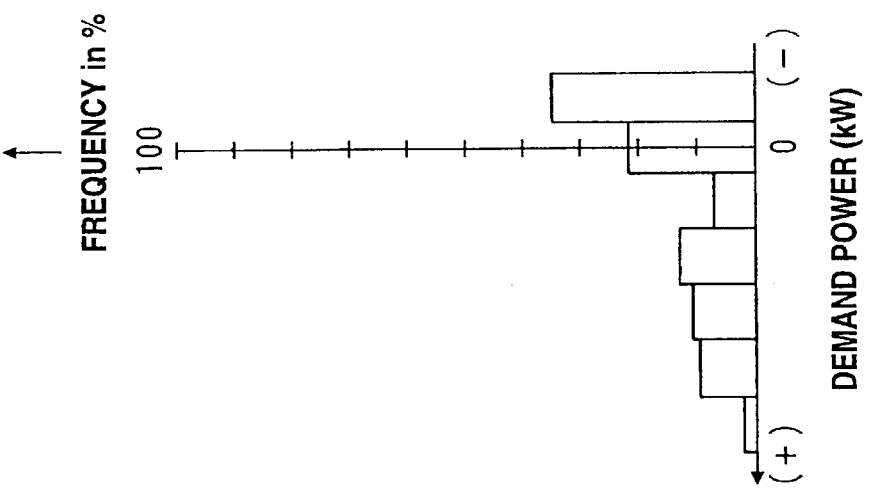
FIGS. 5A, 5B and 5C are diagrams for explaining the operation of the ECU in more detail.
Figure 5B:
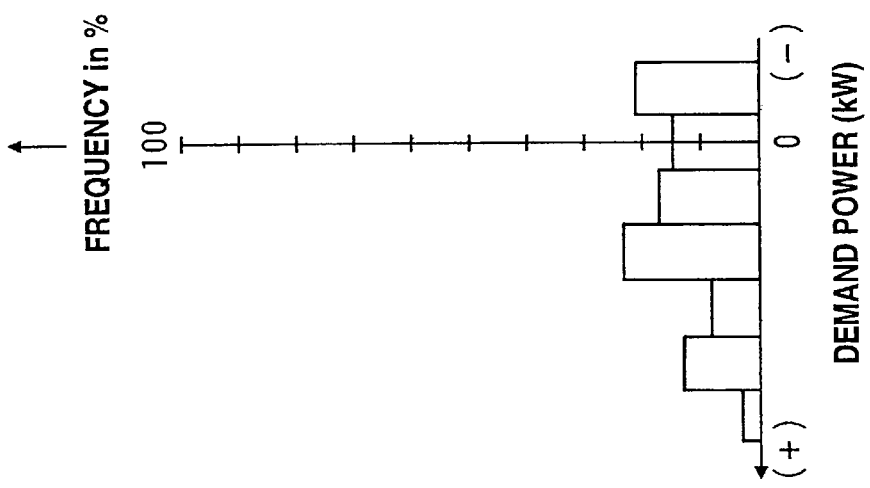

FIGS. 5A to 5B are diagrams for explaining the operation of the engine control means 61 in more detail.

Figure 5C:
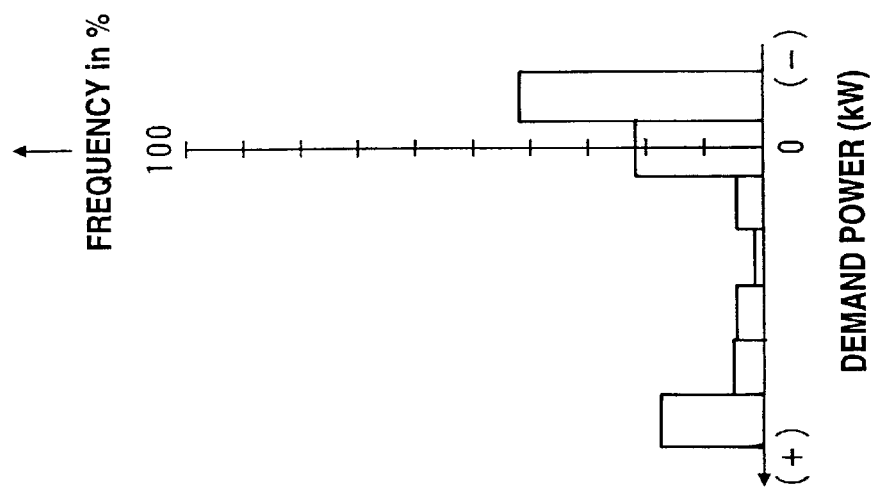

If, as shown in FIG. 5A, the frequency distribution of the power demand values has peak values at regions corresponding to both positive and negative power demand values, if, as shown in FIG. 5B, the power demand values are distributed substantially evenly, or if, as shown in FIG. 5C, the frequency distribution of the power demand values shows a tendency to gradually rises toward the right in the figure, the vehicle running state detecting means 62 estimates that the vehicle is running on a road having repetitive upward and downward slopes. In this case, the engine operation control means 63 selects the power varying pattern so as to set the power varying operation, wherein the speed of the engine 40 is changed depending on the power demand value.

As appreciated, the variation in power demand values is larger in each of FIGS. 5A to 5C as compared with that in each of FIGS. 3A, 3B and 4.

On the other hand, if the vehicle running state detecting means 62 fails to derive the foregoing frequency distribution, the engine operation control means 63 selects the intermediate power constant pattern to set the intermediate power constant operation of the engine within the normal SOC control range. The target output powers of the generator 30 in the respective high, intermediate and low power constant operations are determined within the optimum emission/fuel consumption range based on preselected factors of the vehicle.

Figure 6:
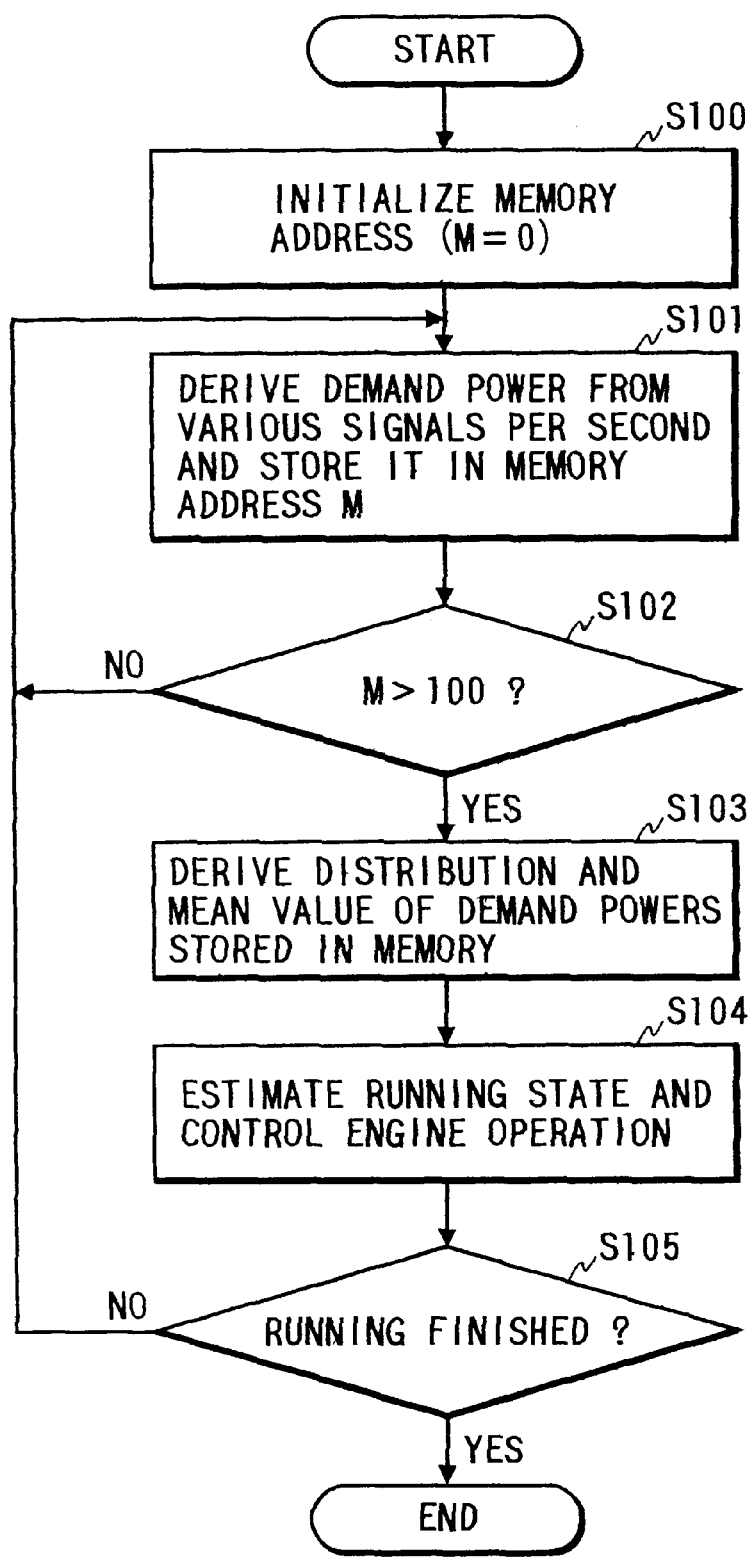
FIG. 6 is a flowchart for explaining the operation of the ECU.

FIG. 6 is a flowchart of a control routine representing the operation of the engine control means 61 of the ECU 60.

The routine starts when an engine switch is set on. Then, at step S100, the engine control means 61 executes the initialization process so that an address M of the memory for storing the power demand value is set to "0".

Subsequently, at step S101, the engine control means 61 reads various sensor signals sent from the sensor section 70, derives the power demand values and stores it in the memory address M. The memory address M is represented by the remainder of the following equation:

$$M=(M+1)/100$$

Then, at step S102, the engine control means 61 determines whether the number of the stored data in the memory is 100 or not. If positive, the routine proceeds to step S103. On the other hand, if negative, the routine returns to step S101 for repeating execution of step S101 until the answer at step S102 becomes positive.

At step S103, that is, after a lapse of 100 seconds, the engine control means 61 derives the frequency distribution of the power demand values stored in the memory and the mean value thereof.

Subsequently, at step S104, the engine control means 61 estimates the vehicle running state based on the frequency distribution of the power demand values and the mean value of such power demand values derived at step S103 and selects the optimum control pattern from the foregoing prestored control patterns based on the estimated vehicle running state. Specifically, the predetermined vehicle running states are stored in the memory of the ECU 60 so as to be identified by the engine control means 61 based on a combination of the frequency distribution of the power demand values and the mean value of the power demand values, and the foregoing four control patterns are stored in the memory of the ECU 60 so as to be selectable by the engine control means 61 based on the identified vehicle running state. At step S104, the engine control means 61 further controls the operation of the engine 40 according to the selected control pattern and thus the output power of the generator 30.

Then, at step S105, the engine control means 61 determines whether the vehicle running is finished. If positive, the routine terminates. On the other hand, if negative, the routine returns to step S101 so as to repeat execution of the foregoing processes.

Figure 8:
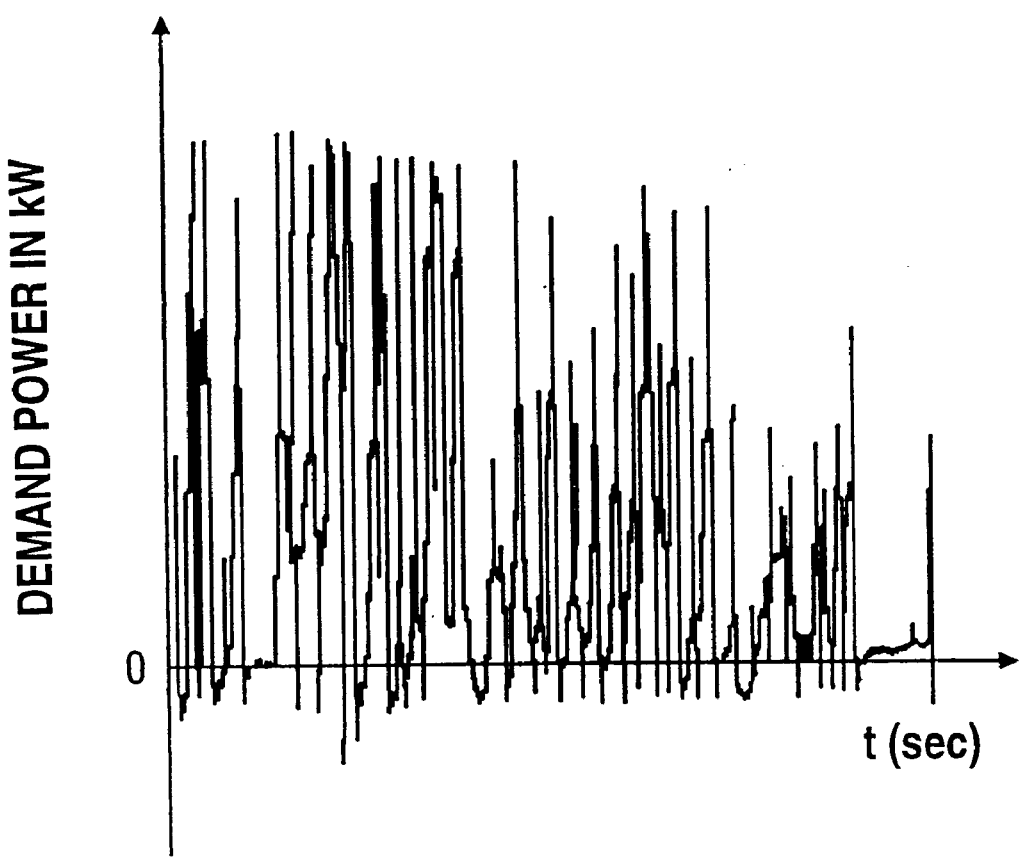
FIG. 8 is a diagram showing one example of power demand values derived per two seconds while the vehicle is running.

FIG. 7A is a diagram showing one example of the output power of the battery according to the prior art, FIG. 7B is a diagram showing one example of the output power of the battery 20 according to the first preferred embodiment, and FIG. 8 is a diagram showing one example of the power demand values derived per two seconds while the vehicle is running on a road having repetitive upward and downward slopes so that the power demand values largely and frequently fluctuate between the plus and minus regions.

The output power of the battery shown in FIG. 7A is caused when the vehicle runs on a road having repetitive upward and downward slopes with the power demand values shown in FIG. 8, while the power constant control of the engine is performed based on the mean value of the power demand values. On the other hand, the output power of the battery 20 shown in FIG. 7B is caused when the vehicle runs on a road having repetitive upward and downward slopes with the power demand values shown in FIG. 8, while the foregoing power varying control of the engine is performed according to the first preferred embodiment.

As shown in FIG. 7A, if the generator output power is controlled depending on the mean value of the power demand values, the output power of the battery caused by charging and discharging fluctuates over a wide range. Thus, an excessive burden is applied to the battery so as to shorten the life of the battery. On the contrary, as shown in FIG. 7B, if the speed of the engine 40 is changed, within the optimum emission/fuel consumption range, depending on the power demand values so as to control the output power of the generator 30 between Wmin and Wmax, the variation width of the output power of the battery 20 is smaller as compared with FIG. 7A so as to prolong the life of the battery.

As described above, according to the foregoing first preferred embodiment, the speed of the engine 40 is changed within the optimum emission/fuel consumption range depending on the power demand values so as to control the output power of the generator 30 when the power demand variation is large, for example, as shown in FIG. 8. This reduces the variation of the output power of the battery 20 so as to prolong the life of the battery 20.

On the other hand, when the power demand variation is small, for example, when running on a superhighway, the engine 40 is driven at a constant speed, which depends on the control pattern selected based on the frequency distribution of the power demand values and the mean value of the power demand values, so as to control the output power of the generator 30 to be constant. This improves the exhaust emission which would be otherwise deteriorated due to the change in operating state of the engine 40.

Figure 9:
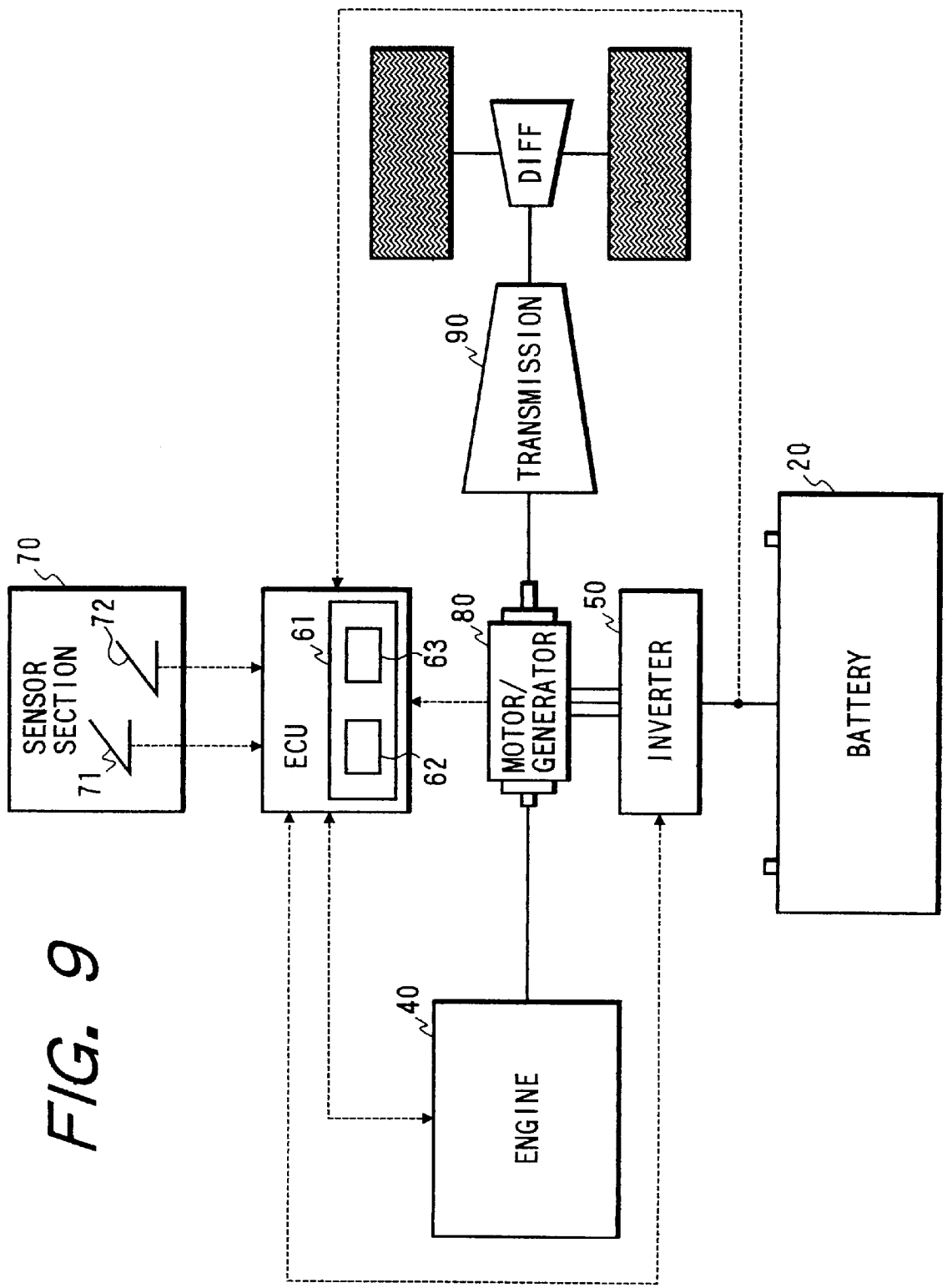
FIG. 9 is a diagram showing a schematic structure of an engine 10 control system for a parallel hybrid vehicle according to a second preferred embodiment of the present invention, wherein the power transmission system is also shown.

FIG. 9 is a diagram showing a schematic structure of an engine control system for a parallel hybrid vehicle according to a second preferred embodiment of the present invention, wherein the power transmission system is also shown.

As shown in FIG. 9, an engine 40 of the parallel hybrid vehicle operats as a main driving source and is coupled to a rotor shaft of a motor/generator (MG) 80. The motor/generator (MG) 80 operates as an auxiliary driving source. The rotor shaft, in turn, is mechanically connected to a power transmission 90. Driven wheels of the vehicle are driven by the rotation power of the engine 40 or the MG 80 via the power transmission 90. The MG 80 is connected to a 100 V high-voltage battery 20 via an inverter 50. The MG 80 operates as a motor and a generator and thus produces the output torque as the motor or the regenerative braking torque as the generator depending on the exciting current value controlled by an ECU 60 via the inverter 50.

Via the inverter 50, the ECU 60 electrically connects the MG 80 to the battery 20, and causes the MG 80 to work as the generator or the motor depending on a relationship between the values of power demanded by the vehicle when the vehicle is running (i.e., power demand values) derived from various detection signals of an acceleration pedal sensor 71, a brake pedal sensor 72 and a speed sensor and the like sent from a sensor section 70 and the output of the engine 40. Specifically, when the engine output is greater, the MG 80 is caused to work as the generator so as to charge the battery 20 using the residual power. On the other hand, when the engine output is smaller, the MG 80 is caused to work as the motor so as to make up for a shortage by drawing power from the battery 20.

Further, during vehicle deceleration, the ECU 60 causes the MG 80 to work as the generator via the inverter 50 so as to charge the battery 20 using the generated deceleration regenerative power, and outputs a signal for stopping the fuel supply to the engine 40.

The ECU 60 includes engine control means 61. The engine control means 61 includes vehicle running state detecting means 62 and engine operation control means 63. The vehicle running state detecting means 62 estimates the vehicle running state based on a frequency distribution of the power demand values derived from various sensor signals obtained at the sensor section 70 and a mean value of the power demand values. On the other hand, the engine operation control means 63 selects one of several control patterns prestored in the memory of the ECU 60 based on the vehicle running state estimated by the vehicle running state detecting means 62, so as to control operation of the engine 40.

Figure 2B:
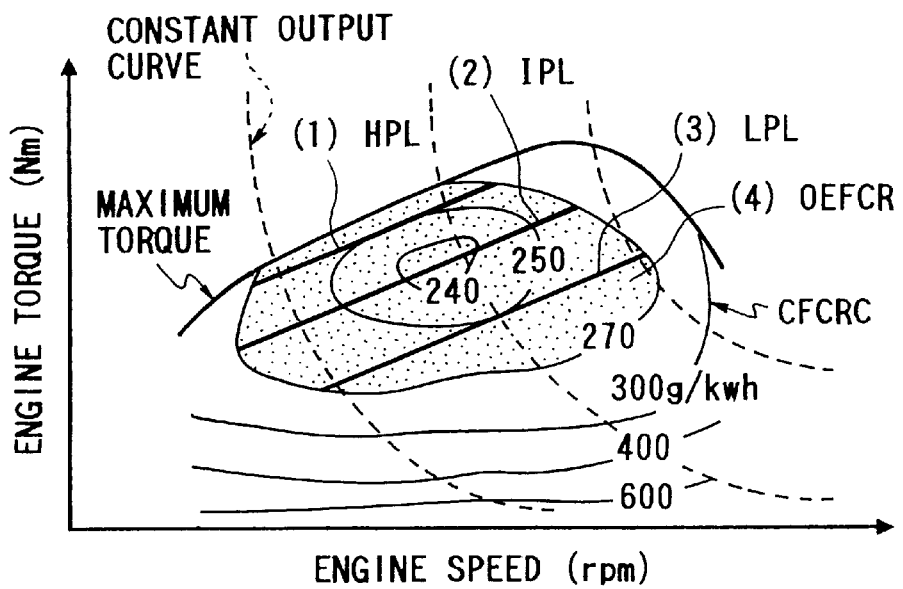
FIG. 2B is a diagram for explaining control patterns for controlling an engine operation of a parallel hybrid vehicle using an ECU.

FIG. 2B is a diagram for explaining the foregoing control patterns for controlling the engine operation of the parallel hybrid vehicle using the engine operation control means 63. In FIG. 2B, CFCRC represents constant-fuel-consumption-rate curves derived based on a relationship between the engine speed and the engine torque. The control patterns include (1) a high power line (HPL) operation pattern in the optimum emission/fuel consumption range (OEFCR); (2) an intermediate power line (IPL) operation pattern (where the fuel consumption rate relative to the output power is the best) in the optimum emission/fuel consumption range; (3) a low power line (LPL) operation pattern in the optimum emission/fuel consumption range; (4) a power varying pattern within the optimum emission/fuel consumption range. Each of these four control patterns is stored in the memory of the ECU 60 so as to be selectable by the vehicle running state estimated by the vehicle running state detecting means 62.

An operating point of the engine 40 on each of the high, intermediate and low power lines is determined based on a selected speed gear ratio or the like.

If, as shown in FIG. 3A, the frequency distribution of the power demand values is concentrated around a power demand value of 0 (zero), the vehicle running state detecting means 62 estimates that the vehicle is stopped or in a traffic jam. In this case, the engine operation control means 63 sets the engine operation based on the low power line operation pattern.

If, as shown in FIG. 3B, the frequency distribution of the power demand values is concentrated at a region corresponding to negative power demand values, the vehicle running state detecting means 62 estimates that the vehicle is running on a downward slope. In this case, the engine operation control means 63 sets the engine operation based on the low power line operation pattern.

If, as shown in FIG. 4, the frequency distribution of the power demand values is concentrated at a region corresponding to positive power demand values and further the mean value of the power demand values is greater than a given value (which has been determined based on preselected factors of the vehicle), the vehicle running state detecting means 62 estimates that the vehicle is running on an upward slope or under a heavy load. In this case, the engine operation control means 63 sets the engine operation based on the high power line operation pattern. On the other hand, if the foregoing mean value is no greater than the foregoing given value, the engine operation control means 63 sets the engine operation based on the intermediate power line operation pattern.

If, as shown in FIG. 5A, the frequency distribution of the power demand values has peak values at regions corresponding to both positive and negative power demand values, if, as shown in FIG. 5B, the power demand values are distributed substantially evenly, or if, as shown in FIG. 5C, the frequency distribution of the power demand values shows a tendency to gradually rise toward the right in the figure, the vehicle running state detecting means 62 estimates that the vehicle is running on a road having repetitive upward and downward slopes. In this case, the engine operation control means 63 sets the engine operation based on the power varying pattern, wherein the output of the engine 40 is changed depending on the power demand values.

On the other hand, if the vehicle running state detecting means 62 fails to derive the foregoing frequency distribution, the engine operation control means 63 selects one of the high, intermediate and low power line operation patterns depending on the battery residual amount.

As described above, according to the foregoing second preferred embodiment, the output of the engine 40 is changed within the optimum emission/fuel consumption range depending on the power demand values so as to absorb variation of the power demand when the power demand variation is large. This reduces the variation of the output power of the battery 20 so as to prolong the life of the battery 20. Further, the energy loss due to charging can be reduced.

On the other hand, when the power demand variation is small, the engine 40 is driven along one of the preset lines depending on the frequency distribution of the power demand values and the mean value thereof. This improves the exhaust emission which would be otherwise deteriorated due to the torque fluctuation of the engine 40, and the energy loss due to charging can be reduced.

By using a non-stage transmission, such as a CVT, as the transmission 90 to control the variation in engine speed, the deterioration of the exhaust emission can be further suppressed.

While the present invention has been described in terms of the preferred embodiments, the invention is not to be limited thereto, but can be embodied in various ways without departing from the principle of the invention as defined in the appended claims.

What is claimed is:

1. An engine control system for a hybrid vehicle having an engine, a motor and a power storage unit for supplying power to said motor, said system comprising:

a plurality of prestored engine operation command patterns;

deriving means for (A) deriving a representation of the operating state of the vehicle from a plurality of power demand values and (B) outputting the representation of the operating state of the vehicle; and control means for (C) selecting one of said prestored engine operation command patterns according to the representation of the operating state of the vehicle and (D) adjusting an operation of the engine based on said selected pattern;

wherein each of the power demand values is derived from a sensor signal indicating an operating condition of the vehicle that has arisen during the period of time for which the vehicle has been continuously running; and wherein the representation of the operating state of the vehicle outputted by said deriving means is based on at least a frequency distribution of the power demand values.

2. The engine control system according to claim 1, wherein the vehicle is a series hybrid vehicle having a generator driven by said engine and wherein said power storage unit is charged by an output power of said generator and said motor is driven by the output power of said generator and an output power of said power storage unit.

3. The engine control system according to claim 1, wherein the vehicle is a series hybrid vehicle having a generator driven by said engine and wherein said power storage unit is charged by an output power of said generator and said motor is driven by the output power of said generator and an output power of said power storage unit.

4. The engine control system according to claim 1, wherein said control means adjusts the speed of the engine.

5. The engine control system according to claim 1, wherein the 20 vehicle is a parallel hybrid vehicle in which said engine is mechanically coupled to driven wheels.

6. The engine control system according to claim 1, wherein the vehicle is a parallel hybrid vehicle in which said engine is mechanically coupled to driven wheels.

7. The engine control system according to claim 1, wherein said control means adjusts an output of the engine.

8. An engine control system according to claim 1, wherein said control means adjusts the power output of the engine.

9. An engine control system according to claim 1, at least one of the power demand values being derived from one among a speed signal, an acceleration signal, and a braking signal.

10. An engine control system according to claim 1, at least two of the power demand values each being derived from one among a speed signal, an acceleration signal, and a braking signal.

11. An engine control system according to claim 1, said representation being further based on a mean value of the power demand values over a predetermined period of time.

12. An engine control system according to claim 1, wherein said plurality of prestored engine operation command patterns comprises:

a first pattern in which the operation of said engine is periodically adjusted while the vehicle is running; and a second pattern in which the operation of said engine is not adjusted;

wherein said control means selects said first pattern when a degree of variation among the power demand values exceeds a predetermined threshold, and said control means selects said second pattern when the degree of variation among the power demand values is below the predetermined threshold.

13. An engine control system according to claim 1, at least one of the power demand values being derived from one among a speed signal, an acceleration signal, and a braking signal.

14. An engine control system according to claim 1, at least two of the power demand values each being derived from one among a speed signal, an acceleration signal, and a braking signal.

15. An engine control system according to claim 1, said representation being further based on a mean value of the power demand values over a predetermined period of time.

16. An engine control system according to claim 1, at least one of the power demand values being derived from one among a speed signal, an acceleration signal, and a braking signal.

17. An engine control system according to claim 1, at least two of the power demand values each being derived from one among a speed signal, an acceleration signal, and a braking signal.

* * * * *